United States Patent
Parfitt

(10) Patent No.: US 9,353,615 B2
(45) Date of Patent: May 31, 2016

(54) DOWN HOLE SURVEYING TOOL

(75) Inventor: Richard John Parfitt, Lewes (GB)

(73) Assignee: Imdex Global B.V., Amsterdam, Zuidoost (NL)

( * ) Notice: Subject to any disclaimer, the term of this patent is extended or adjusted under 35 U.S.C. 154(b) by 676 days.

(21) Appl. No.: 13/699,671

(22) PCT Filed: May 25, 2011

(86) PCT No.: PCT/AU2011/000628
§ 371 (c)(1),
(2), (4) Date: Jan. 30, 2013

(87) PCT Pub. No.: WO2011/146986
PCT Pub. Date: Dec. 1, 2011

(65) Prior Publication Data
US 2013/0118731 A1 May 16, 2013

(30) Foreign Application Priority Data

May 25, 2010 (AU) .............................. 2010902277

(51) Int. Cl.
*E21B 47/022* (2012.01)
*E21B 47/00* (2012.01)
(Continued)

(52) U.S. Cl.
CPC ................ *E21B 47/00* (2013.01); *B23Q 16/12* (2013.01); *E21B 47/022* (2013.01); *G01C 19/04* (2013.01); *G01C 19/34* (2013.01); *G01C 19/40* (2013.01); *E21B 47/02* (2013.01); *Y10T 74/14* (2015.01)

(58) Field of Classification Search
CPC ........ G01C 19/02; G01C 19/04; G01C 19/06; G01C 19/08; G01C 19/025; G01C 19/30; G01C 19/46; G01C 19/48; G01C 19/16; G01C 19/18; G01C 19/34; G01C 19/40; E21B 47/02; E21B 47/022; B23Q 16/02; B23Q 16/12; Y10T 74/14
USPC ............................................ 33/324, 304, 365
See application file for complete search history.

(56) References Cited

U.S. PATENT DOCUMENTS 3,667,556 A * 6/1972 Henderson ...................... 175/73
4,537,067 A 8/1985 Sharp et al.
(Continued)

FOREIGN PATENT DOCUMENTS

GB 733024 7/1955
GB 2370645 5/2003

OTHER PUBLICATIONS

International Search Report for International Application No. PCT/AU2011/000628 mailed Jun. 24, 2011.
(Continued)

*Primary Examiner* — Jennifer H Gay
*Assistant Examiner* — George Gray
(74) *Attorney, Agent, or Firm* — Merchant & Gould P.C.

(57) ABSTRACT

A down hole surveying tool (10) is for directional surveying of boreholes. The tool (10) includes a body (11) which accommodates a two-axis gyroscope (13) and a two-axis accelerometer (15). The gyroscope (13) and accelerometer (15) are rigidly fixed with respect to each other to provide a composite sensor device (17). The sensor device (17) is supported in a rotary mount (31) for rotation about an indexing axis (4). The sensor device (17) can be indexed about the indexing axis between two indexing positions which are 180 degrees apart. An indexing mechanism (70) is provided for selectively indexing the sensor device (17) about the indexing axis (4). The indexing mechanism (70) includes a drive portion (71) and a driven portion (72) adapted for selective interaction to impart indexing motion to the sensor device (17). The driven portion (72) is movable into and out of engagement with the drive portion (71) upon rotation of the rotary mount (31) about a pitch axis (1) using a pitch drive mechanism (51).

34 Claims, 12 Drawing Sheets

(51) Int. Cl.
  *G01C 19/34* (2006.01)
  *G01C 19/40* (2006.01)
  *G01C 19/04* (2006.01)
  *B23Q 16/12* (2006.01)
  *E21B 47/02* (2006.01)

(56) References Cited

U.S. PATENT DOCUMENTS

| | | |
|---|---|---|
| 4,542,647 A | 9/1985 | Molnar |
| 4,909,336 A | 3/1990 | Brown et al. |
| 4,935,883 A | 6/1990 | Hulsing, II |
| 5,138,877 A | 8/1992 | Desbrandes |
| 5,806,195 A | 9/1998 | Uttecht et al. |
| 6,324,904 B1 | 12/2001 | Ishikawa |
| 7,117,733 B2 | 10/2006 | Engels |
| 7,587,936 B2 | 9/2009 | Han |
| 7,757,552 B2 | 7/2010 | Bogath et al. |
| 8,015,868 B2 | 9/2011 | Hassan et al. |
| 8,522,611 B2 | 9/2013 | Frumin et al. |
| 2002/0116130 A1 | 8/2002 | Estes et al. |
| 2006/0106587 A1 | 5/2006 | Rodney |
| 2009/0119937 A1 | 5/2009 | Watson |
| 2009/0287451 A1 | 11/2009 | Sato et al. |
| 2010/0198518 A1* | 8/2010 | Ekseth et al. ............ 702/6 |
| 2013/0125642 A1 | 5/2013 | Parfitt |

OTHER PUBLICATIONS

International Search Report for International Application No. PCT/AU2011/000632 mailed Sep. 2, 2011.
Office Action for co-pending U.S. Appl. No. 13/699,670 mailed Apr. 7, 2015 (12 pages).

\* cited by examiner

DOWN HOLE SURVEYING TOOL

This application is a National Stage Application of PCT/AU2011/000628, filed 25May 2011, which claims benefit of Ser. No. 2010902277, filed 25May 2010in Australia and which applications are incorporated herein by reference. To the extent appropriate, a claim of priority is made to each of the above disclosed applications.

FIELD OF THE INVENTION

This invention relates to apparatus for indexing a device between various indexing positions about an indexing axis. The invention also relates to a down hole surveying tool incorporating such apparatus, in which case the device typically comprises a sensor used in a down hole surveying operation. The invention also relates to a method of performing a down hole surveying operation

BACKGROUND ART

The following discussion of the background art is intended to facilitate an understanding of the present invention only. The discussion is not an acknowledgement or admission that any of the material referred to is or was part of the common general knowledge as at the priority date of the application.

During a borehole drilling operation there is a need to survey the path of the borehole to determine if the trajectory is being maintained within acceptable limits. Surveying a borehole is usually accomplished using a surveying tool which is moved along the borehole to obtain the information required, or at least data from which the required information can be determined. Information in relation the path of a borehole can typically include inclination, azimuth and depth.

Surveying tools typically contain sensor devices for measuring the direction and magnitude of the, local gravitational field, and also the rate of rotation of the Earth. These measurements correspond to the position and orientation of the surveying tool in the borehole. The position, inclination and/or azimuth can be calculated from these measurements.

The sensor devices-can comprise accelerometers for measuring the direction and magnitude of the local gravitational field, and gyroscopes for measuring the rate of rotation of the Earth, from which azimuth can be calculated.

Commercially available gyroscopes contain systematic errors which can seriously affect the accuracy of measurement.

With a view to eliminating, or at least reducing the systematic errors, it is known to index gyroscopes through 180 degrees between two indexing positions, with measurements being taken at the two indexing positions. Because the indexing positions are 180 degrees apart, the measurements will be reversed; that is, the measurements deliver the same data but with reversed polarity. With these measurements, the systematic errors can be eliminated or diminished.

Commercially available accelerometers also contain systematic errors which can be handled in a similar way.

In order to index sensor devices, such as gyroscopes and/or accelerometers, between various indexing positions, there is a need for an indexing mechanism aboard the surveying tool.

There is also a need to orient the sensor devices so that two orthogonal sensitive axes occupy a selected plane, which typically is horizontal.

The need to index and orient the sensor devices can introduce cost and complexity to the surveying tool, and can be particularly problematic where a survey tooling of compact construction is required.

It is against this background, and the problems and difficulties associated therewith, that the present invention has been developed.

DISCLOSURE OF THE INVENTION

According to a first aspect of the invention there is provided apparatus for indexing a device about an indexing axis, the apparatus comprising a base, a support for supporting the device for rotation about the indexing axis, the support comprising a rotary mount supported on the base for rotation about a pitch axis transverse to the indexing axis, an indexing drive mechanism for indexing the device about the indexing axis, the indexing drive mechanism comprising a drive portion and a driven portion, the drive portion being provided on the base and the driven portion being provided on the rotary mount and drivingly connected to device, the driven portion being movable into and out of engagement with the drive portion upon rotation of the rotary mount about the pitch axis, whereby when the driven portion is in engagement with the drive portion it can receive drive therefrom to cause indexing of the device about the indexing axis.

With this arrangement, the drive portion is not required to be accommodated on the support which carries the device. Avoiding the need to accommodate the drive portion on the support is conducive to a compact arrangement and offers a useful reduction in the size of the apparatus.

The drive portion may comprise a drive element adapted for mounted eccentrically for rotation about a drive axis. The drive element may comprise a drive pin configured as a roller pin.

The drive element may be provided at one end of a drive shaft which has an axis of rotation and which is configured as a crank, with the drive element offset from the axis of rotation of the drive shaft.

The drive portion may further comprise an indexing drive motor drivingly coupled to the drive shaft for selectively rotating the drive shaft about its axis in either direction. Upon rotation of the drive shaft, the eccentric drive element is caused to move laterally through a circular path about the axis The driven portion may comprise an indexing head rotatably mounted on the support and connected to the device, the indexing head being engagable with the drive element to receive rotational drive therefrom. The indexing head may comprise an indexing plate configured to define a cam profile presenting a cam face. The cam profile may be configured to define a recess into which the drive pin can be received. The cam profile may also define two lobes on opposed sides of the recess.

Upon rotation of the drive shaft, the eccentric drive element is caused to move laterally through a circular path about the axis of rotation of the drive shaft, imparting rotation to the indexing plate and thereby causing the device to undergo indexing motion.

The apparatus may further comprise a pitch drive mechanism for selectively rotating the rotary mount about the pitch axis. This facilitates movement of the driven portion into and out of engagement with the drive portion. Where appropriate, it may also be used to orient the device about the pitch axis.

The pitch drive mechanism may comprise a pitch drive motor drivingly coupled to the rotary mount. The pitch drive motor may be drivingly coupled to the rotary mount through a drive transmission comprising a ring gear mounted on the rotary mount coincidently with the pitch axis. The drive transmission may further comprise a drive shaft, and a drive pinion which is rigidly mounted on the drive shaft and which is in meshing engagement with the ring gear. With this arrangement, the rotary mount can be selectively caused to undergo pitch rotation about the pitch axis by actuation of the pitch drive motor, the direction of pitch rotation being determined by the direction of rotation of the drive motor.

The device supported for rotation about the indexing axis may comprise a sensor device. The sensor device may be of any appropriate type; for example, the sensor device may comprise one of more gyroscopes, one or more accelerometers or a combination thereof.

Where the sensor device comprises a gyroscope, the latter may comprise a two-axis gyroscope mounted on the support such that the two sensitive axes are perpendicular to the indexing axis.

Where the sensor device comprises an accelerometer, the latter may comprise a two-axis accelerometer mounted on the support such that the two sensitive axes are perpendicular to the indexing axis.

The senor device may be a composite device comprising a two-axis gyroscope and a two-axis accelerometer, with the respective sensitive axes perpendicular to the indexing axis. The two-axis gyroscope and a two-axis accelerometer may be interconnected for rotation in unison about the indexing axis.

It may be necessary to align the driven portion with respect to the drive portion prior to actuation of the drive portion. Specifically, it may be necessary to align the pitch of the rotary mount prior to indexing so that the indexing plate is presented correctly to the drive element, with the drive element received within the recess in the indexing plate. An optical alignment system may be provided for sensing alignment between the drive portion and the driven portion for operative engagement therebetween, whereby the driven portion can receive drive from the drive portion to cause indexing of the sensor device about the indexing axis.

The optical alignment system may comprise a first optical signal transmitter and a first optical signal receiver adapted to cooperate to confirm that alignment is correct.

The first optical signal transmitter may be adapted to generate and project a modulated beam of light from the indexing platform in a direction perpendicular to the surface of the indexing plate and radial to the indexing axis. The first optical signal transmitter may comprises a central aperture in the indexing plate and an optical emitting device located behind the aperture for emitting the modulated beam of light.

The first optical signal receiver may comprises a corresponding aperture and optical detector mounted externally of the rotary mount, typically on the base, in such a way that the two apertures align and the modulated beam is detected when the indexing plate is in the correct position.

The optical alignment system may also be configured to detect that the device has indexed correctly about the indexing axis into the desired indexing position. In the arrangement where there are two indexing positions for the device, with the two indexing positions being 180 degrees apart, the optical alignment system may comprises the optical signal transmitter and a second optical signal transmitter offset from the first optical signal transmitter. The second optical signal transmitter may comprise a second aperture in the indexing plate and an optical emitting device located behind the aperture for emitting the modulated beam of light.

The optical alignment system further comprises the first optical signal receiver and one or more further optical signal receivers offset from the first optical signal receiver. There may, for example, be two further optical signal receivers on opposed sides of the first optical signal receiver. With this arrangement, the first optical signal transmitter and a first optical signal receiver cooperate to provide confirmation of alignment of the pitch of the rotary mount prior to indexing so that the indexing plate is presented correctly to the drive element. Further, the second optical signal transmitter cooperates with the further optical signal receivers to provide confirmation that the sensor device has indexed correctly into the desired indexing position. As the two indexing positions are 180 degrees apart, one of the two further optical signal receivers functions to monitor one indexing position and the other of the two further optical signal receivers functions to monitor the other indexing position.

Such an arrangement provides a simple yet highly effective alignment system which obviates the need for a rotary position encoder which could add cost, size and complexity to the apparatus.

There may be a need to provide for electrical connectivity between the base and the rotary mount which is supported on the base for rotation about the pitch axis. Typically, the base accommodates electronic circuitry which is connected electrically to componentry on the rotary mount.

The electrical connectivity may be provided by a flexible connecting cable extending between the rotary mount and the base, with one end section of the cable connected to the rotary mount, the other end section of the cable connected to the base, and an intermediate section of the cable configured as a loop.

The cable may comprise a flat multi-core cable.

The loop may be accommodated in a cable receptacle having two opposed sides and an open end through which the cable extends.

The loop may comprise two straight sections and a turn section extending between the two straight sections. The two straight sections may be constrained and guided by sides of the cable receptacle, with one straight section being adapted to undergo translation motion, sliding along the adjacent side of the cable receptacle upon rotation of the rotary mount. This accommodates relative movement between the rotary mount and the base.

Such an arrangement provides a simple yet highly effective electrical connection between connectivity between the rotary mount and the base, which is compact and which obviates the need for a conventional slip ring assembly for electrical connectivity.

As mentioned above, the device is supported for rotation about the indexing axis between the indexing positions. There may be a need for electrical connectivity between the device and the support which carries the device in a manner accommodating the indexing movement.

The electrical connectivity may be provided a flexible connecting cable extending between the device and the support, with one end section of the cable connected to the device, the, other end section of the cable connected to the support and the intermediate section of the cable coiled about the indexing axis. The cable may comprise a flat multi-core cable to provide a compact arrangement. Typically, the cable is accommodated about the device in a space between the device and the surrounding support in which the device is accommodated. The intermediate section may be coiled several times to accommodate the relative rotational movement between the indexing device and the support. As the device rotates about the indexing axis from one indexing position to another, the coiled intermediate section simply winds and unwinds according to the direction of movement, with electrical connectivity being maintained at all times.

Such an arrangement provides a simple yet highly effective electrical connection between the sensor device and the rotary mount, which is compact and which obviates the need for a conventional slip ring assembly for electrical connectivity.

According to a second aspect of the invention there is provided a down hole surveying tool incorporating apparatus according to a first aspect of the invention, wherein the device comprises a sensor device.

According to a third aspect of the invention there is provided a down hole surveying tool comprising a sensor device rotatable about an indexing axis, a base, a support for supporting the sensor device for rotation about the indexing axis, the support comprising a rotary mount supported on the base for rotation about a pitch axis transverse to the indexing axis, a pitch drive mechanism for selectively rotating the rotary mount about the pitch axis, and an indexing drive mechanism for indexing the sensor device about the indexing axis, the indexing drive mechanism comprising a drive portion and a driven portion, the drive portion being provided on the base and the driven portion being provided on the rotary mount and drivingly connected to the sensor device, the driven portion being movable into and out of engagement with the drive portion upon rotation of the rotary mount about the pitch axis, whereby when the driven portion is in engagement with the drive portion it can receive drive therefrom to cause indexing of the sensor device about the indexing axis.

According to a fourth aspect of the invention there is provided a method of performing a down hole surveying operation using a down hole surveying tool according to the second or third aspect of the invention.

According to a fifth aspect of the invention there is provided a method of performing a down hole surveying operation comprising: positioning a surveying tool at a selected location within a borehole, the surveying tool having a sensor device with at least two sensitive axes; orienting the sensor device such that the two sensitive axes occupy a selected plane; obtaining a measurement from the sensor device at the selected location; moving the sensor device into an indexing position at which the sensor device can be indexed about an indexing axis perpendicular to the two sensitive axes; returning the indexed sensor device to the position at which the two sensitive axes occupied the selected plane; and obtaining a further measurement from the sensor device at the selected location.

The method may further comprise sequentially positioning the survey tool at one or more further selected locations within the borehole; orienting the sensor device such that the two sensitive axes occupy a selected plane at the further selected location; obtaining a measurement from the sensor device at the further selected location; moving the sensor device into the indexing position at which the sensor device can be indexed about an indexing axis perpendicular to the two sensitive axes; returning the indexed sensor device to the position at which the two sensitive axes occupied the selected plane at the further selected location; and obtaining a further measurement from the sensor device at the further selected location.

BRIEF DESCRIPTION OF THE DRAWINGS

The invention will be better understood by reference to the following description of one specific embodiment thereof as shown in the accompanying drawings in which.

BEST MODE(S) FOR CARRYING OUT THE INVENTION

Figure 1:
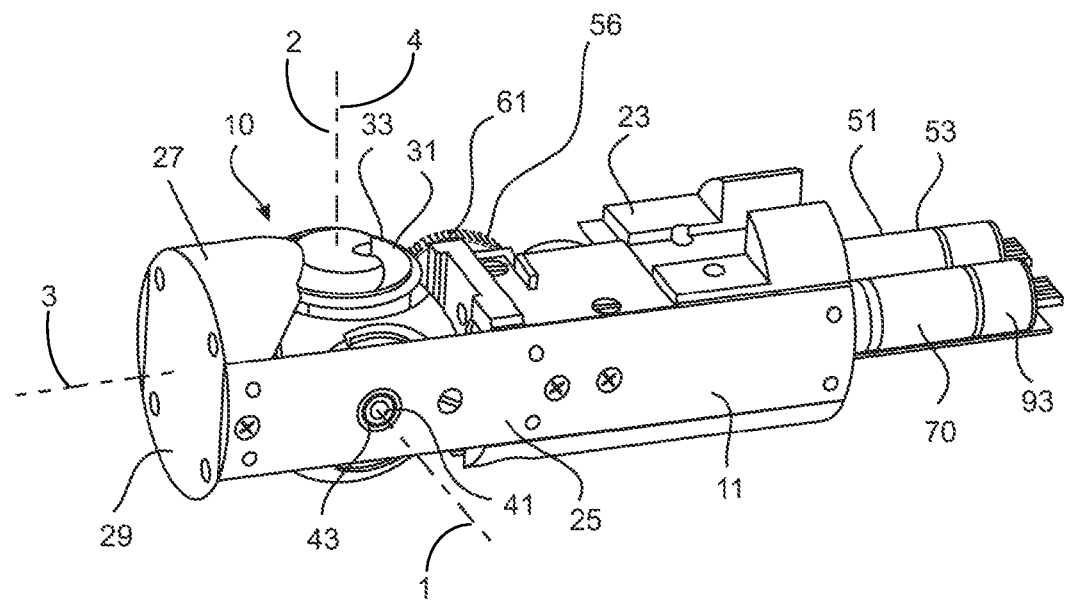
FIG. 1 is a perspective view of a down hole surveying tool according to the embodiment, with part of the exterior housing removed to reveal internal features.

Referring to the drawings, there is shown a down hole surveying system 10 for directional surveying of boreholes. The down hole surveying system 10 is configured as a tool which, for convenience, is also denoted by the same reference numeral 10. The tool 10 comprises a body 11 which is sized and shaped for movement along a borehole in down hole surveying applications where the maximum passage diameter is typically about 45 mm. The body 11 accommodates a single mechanical gyroscope 13 and a single accelerometer 15.

The gyroscope 13 and accelerometer 15 are rigidly fixed with respect to each other to provide a sensor package which will hereinafter be referred to as a composite sensor device 17. In this embodiment, the gyroscope 13 is a two-axis gyroscope and the accelerometer 15 is a two-axis accelerometer. Other configurations within the sensor package are, of course, possible. The two sensitive axes for the gyroscope 13 are identified in FIG. 25 by reference numerals 13a and 13b. Similarly, the two sensitive axes for the accelerometer 15 are identified in FIG. 25 by reference numerals 15a and 15b.

Figure 2:
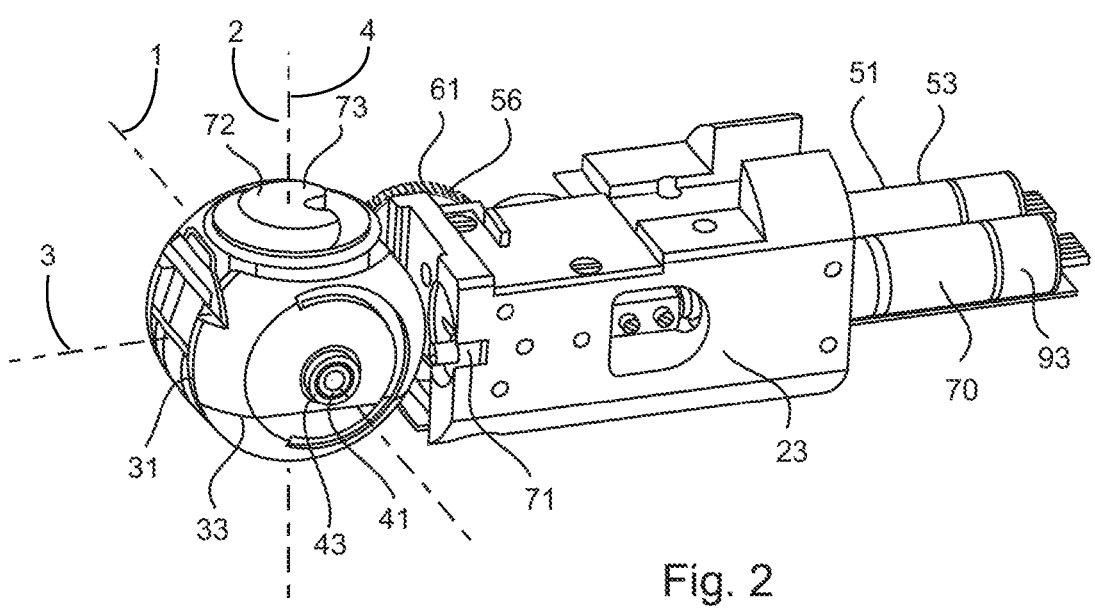
FIG. 2 is a view similar to FIG. 1 but with further parts removed to reveal additional internal features.
Figure 3:
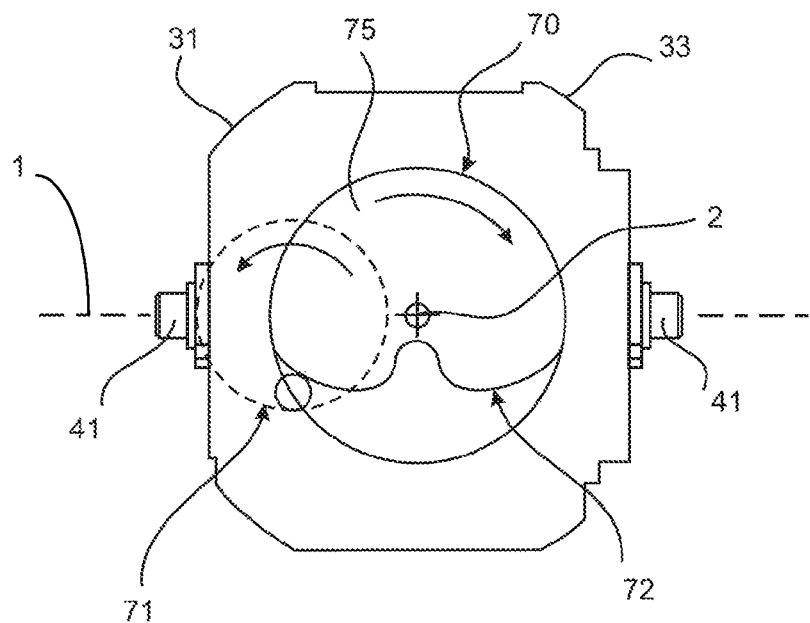
FIG. 3 is schematic plan view of a rotary mount for a sensor device movable between two indexing positions, the rotary mount being configured, as an indexing platform and an indexing mechanism operable in conjunction with the indexing platform.
Figure 4:
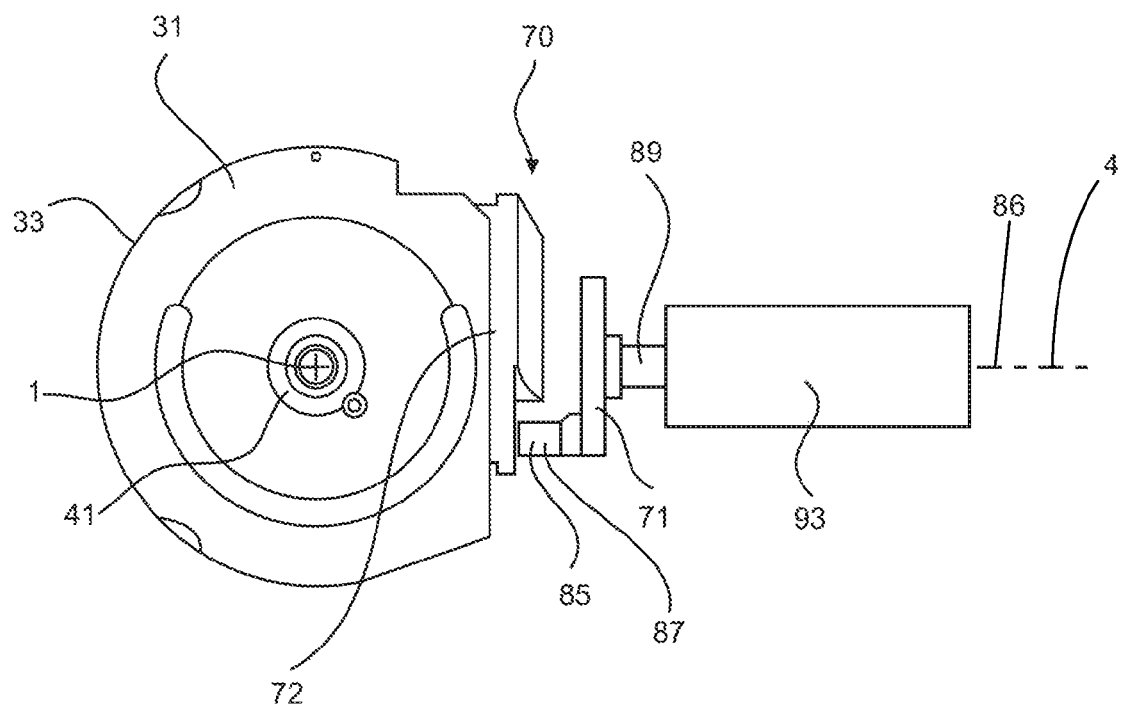
FIG. 4 is a side, view of the arrangement shown in FIG. 3.

The tool 10 is configured for selectively rotating the sensor device 17 about first and second mutually perpendicular axes 1, 2, which for convenience will be referred to pitch and yaw axes respectively. The first and second axes 1, 2 are shown in FIG. 2.

The body 11 has a longitudinal axis 3 about which it can roll, which will be referred to as the roll axis. When the tool 10 is down the borehole, the roll axis 3 is aligned with the longitudinal extent of the adjacent section of the borehole in which the tool 10 is located at any particular time.

The yaw axis 2 is perpendicular to the sensitive axes of the two-axis gyroscope 13 and the two-axis accelerometer 15.

Rotation about the pitch and roll axes 1, 3 allow the respective planes of the sensitive axes of the gyroscope 13 and accelerometer 15 to be aligned as required. In this embodiment, the gyroscope 13 and accelerometer 15 are required to be moved into sensing positions in which their respective sensitive axes occupy horizontal planes.

Rotation about the yaw axis 2 allows indexation of the gyroscope 13 and the accelerometer 15 through various indexing positions, with a consequent reduction or cancellation of systematic errors in both devices. Specifically, the sensor device 17 is selectively rotatable about the yaw axis 2 between various indexing positions, as will be explained in more detail later. In this embodiment, the sensor device 17 is rotatable about the yaw axis 2 between two indexing positions which are 180 degrees apart.

While not shown in the drawings, a drive mechanism is provided for varying the roll angle of the housing 29 within the borehole; that is, for rotating the housing 29 about the roll axis 3.

The body 11 comprises a base 23, two side members 25 and a cover 27 forming a housing 29. The cover 27 is shown partly cut-away in FIG. 1, and the two side members 25 and cover 27 are removed from FIG. 2 to reveal internal parts.

Figure 25:
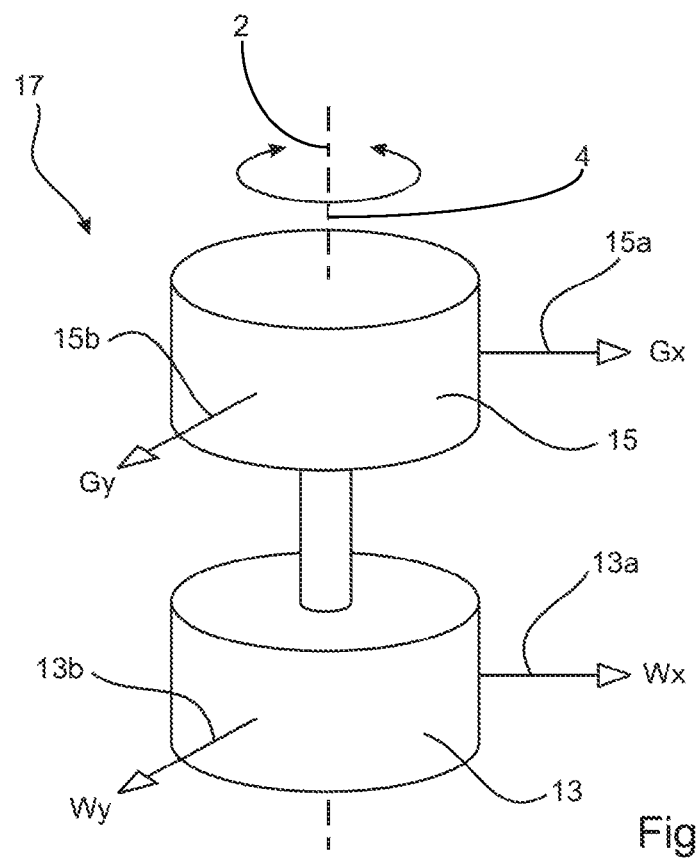
FIG. 25 is a schematic view of a composite sensor device used in the down hole surveying tool.
Figure 26:
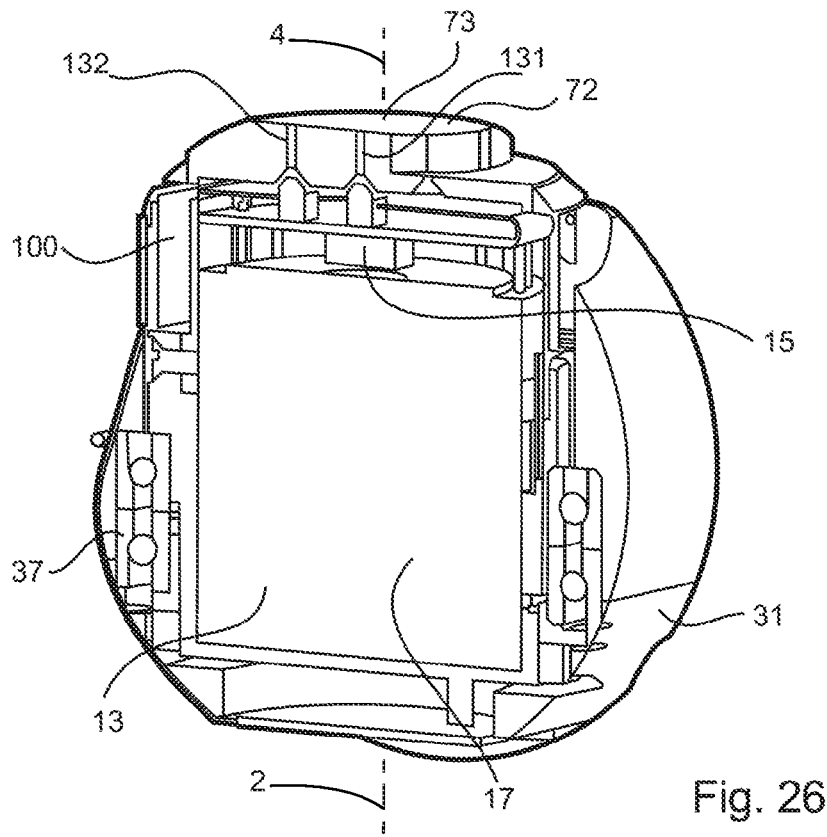
FIG. 26 is a sectional perspective view of the indexing platform, illustrating in particular the composite sensor device supported therein.

The sensor device 17 is supported in a rotary mount 31 accommodated within the housing 29. The rotary mount 31 is configured as spherical indexing platform 33 in which the sensor device 17 is supported for rotation about the yaw axis 2. With this arrangement, the yaw axis 2 defines an indexing axis 4 about which the sensor device 17 can be indexed, as will be explained later. Accordingly, the various sensitive axes of the gyroscope 13 and accelerometer 15 are substantially perpendicular to the indexing axis 4, as shown in FIG. 25.

Figure 16:
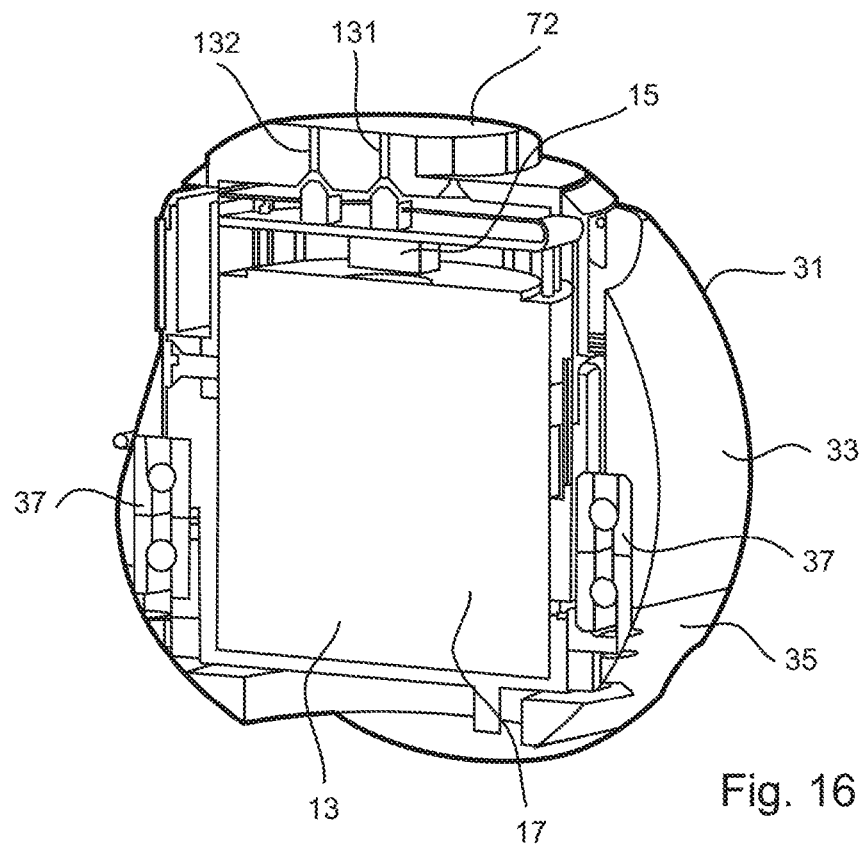
FIG. 16 is a sectional view further illustrating the indexing platform, the sensor device, and the flexible connecting cable extending between the sensor device and the platform.
Figure 17:
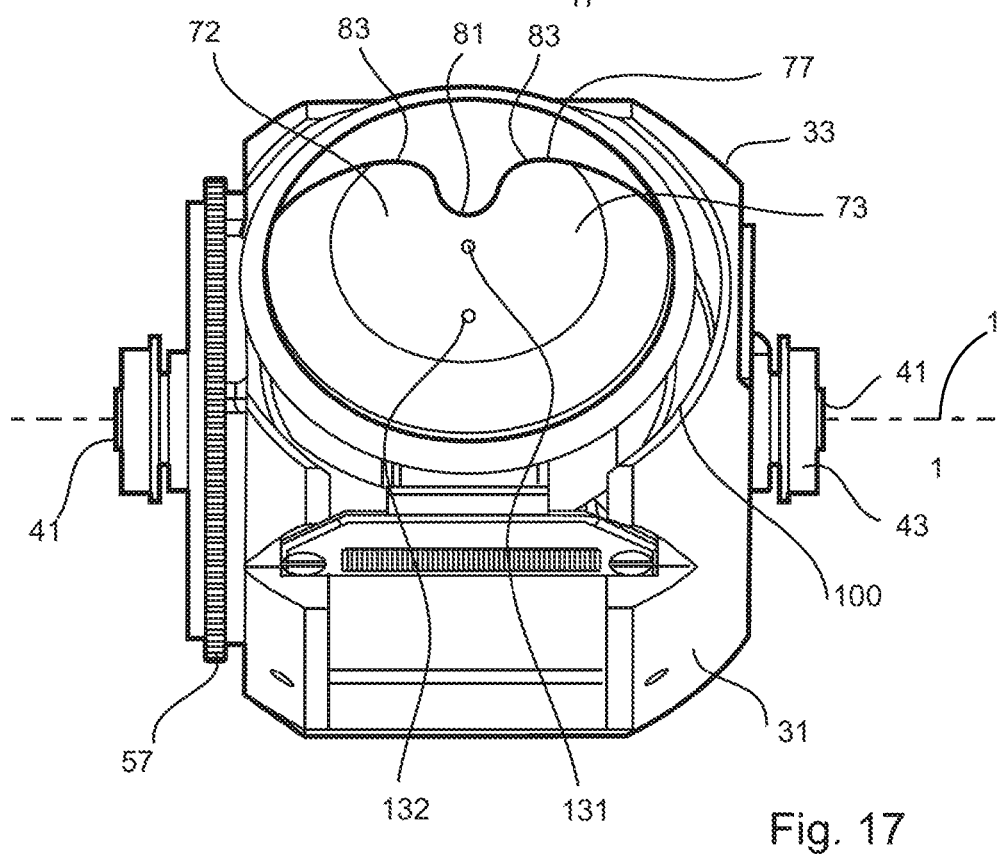
FIG. 17 is a perspective view illustrating the indexing platform, the sensor device, and the flexible connecting cable extending between the sensor device and the platform.

The indexing platform 33 comprises a hollow body 35 in which the sensor device 17 is rotatably supported, as best seen in FIG. 16. The gyroscope 13 is rotatably supported in a pair of pre-loaded bearings 37 located between the gyroscope 13 and the hollow body 35.

The indexing platform 33 is supported within the housing 29 for rotation about the pitch axis 1 which is transverse to the indexing axis 4. In the arrangement illustrated, the indexing platform 33 has two stub axles 41 having axes which cooperate to provide the pitch axis 1. The stub axles 41 are rotatably supported in bearings 43 mounted in the side members 25.

A pitch drive mechanism 51 is provided for selectively rotating the indexing platform 33 about the pitch axis 1. This allows the sensor device 17 to be rotated into any selected plane about the pitch axis 1 for sensing purposes.

The pitch drive mechanism. 51 comprises a pitch drive motor 53 drivingly coupled to the indexing platform 33. The pitch drive motor 53 is drivingly coupled to the indexing platform 33 through a drive transmission 56 comprising a ring gear 57 mounted on the indexing platform 33 coincidently with the pitch axis 1. The drive transmission 56 further comprises a drive shaft (not shown) and a drive pinion 61 which is rigidly mounted on the drive shaft and which is in meshing engagement with the ring gear 57. With this arrangement, the indexing platform 33 can be selectively caused to undergo pitch rotation about the pitch axis 1 by actuation of the drive motor 53, the direction of pitch rotation being determined by the direction of rotation of the drive motor.

An indexing mechanism 70 is provided for selectively indexing the sensor device 17 about the indexing axis 4. As mentioned earlier, in this embodiment, the sensor device 17 is rotatable about the indexing axis 4 between two indexing positions which are 180 degrees apart.

The indexing mechanism 70 comprises a drive portion 71 and a driven portion 72 adapted for selective interaction to impart indexing motion to the sensor device 17.

The driven portion 72 comprises an indexing head 73 rotatably mounted on the indexing platform 33 and connected to the sensor device 17. The indexing head 73 comprises an indexing plate 75 configured to define a cam profile 77 presenting a cam face 79. The cam profile 77 is configured to define a recess 81 and two lobes 83 on opposed sides of the recess.

The drive portion 71 comprises a drive element 85 adapted to impart rotation to the indexing plate 75. The drive element 85 is mounted eccentrically for rotation about a drive axis 86. The drive element 85 comprises a drive pin 87 provided at one end of a drive shaft 89 having an axis of rotation corresponding to the drive axis 86. The drive pin 87 is configured as a roller pin. The drive shaft 89 is configured as a crank, with the drive pin 87 offset from the axis of rotation of the drive shaft.

Figure 5:
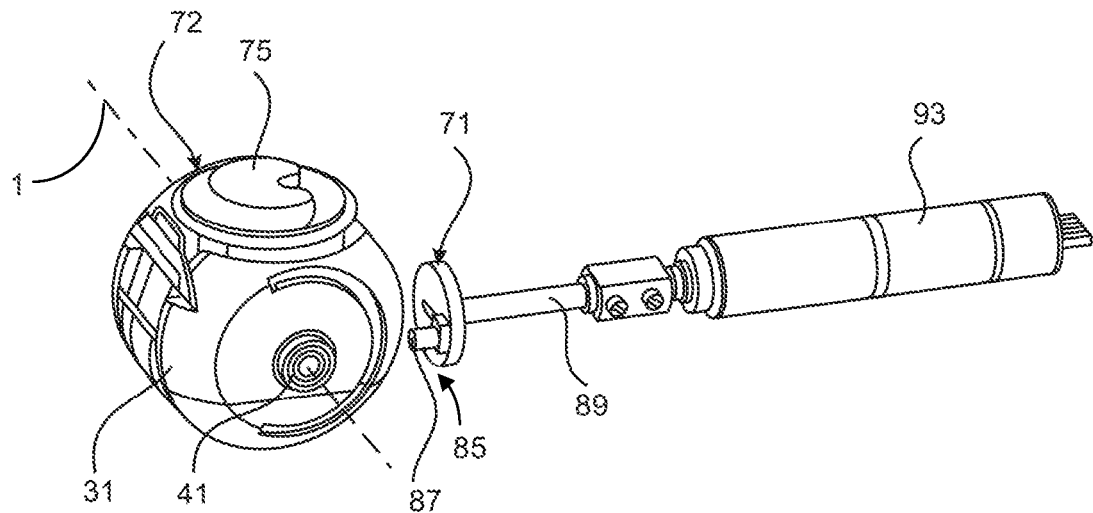
FIG. 5 is perspective view of the indexing platform and the indexing mechanism, with the indexing platform shown in a first position.
Figure 6:
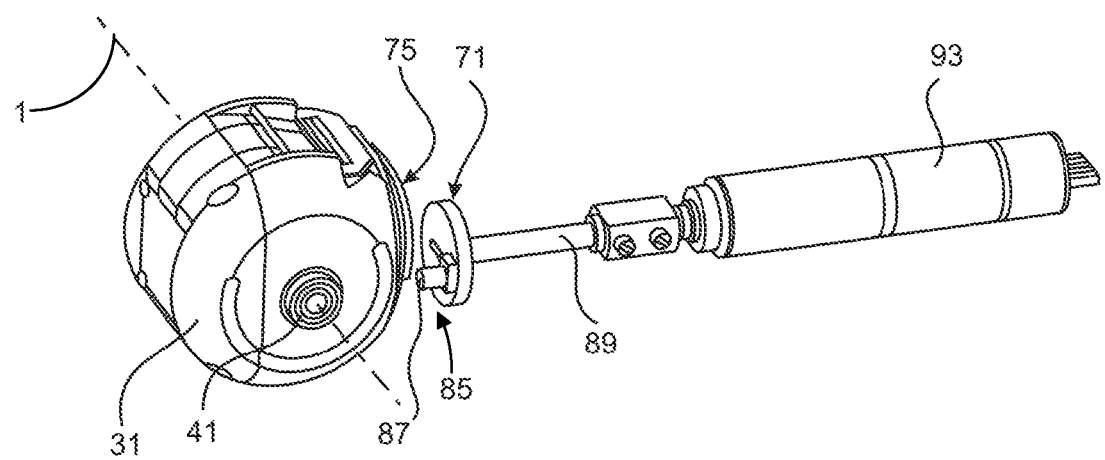
FIG. 6 is a view similar to FIG. 5, except that the indexing platform is shown rotated into a second position for operation of the indexing mechanism.
Figure 7:
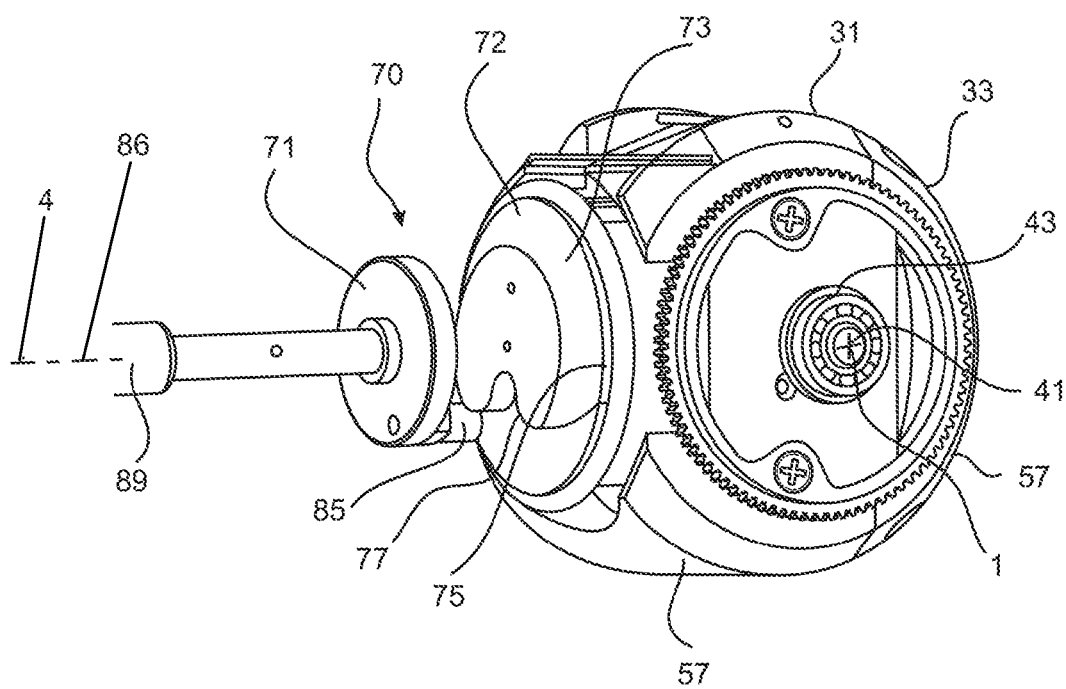
FIG. 7 is a further perspective view, illustrating in particular the indexing mechanism.
Figure 8:
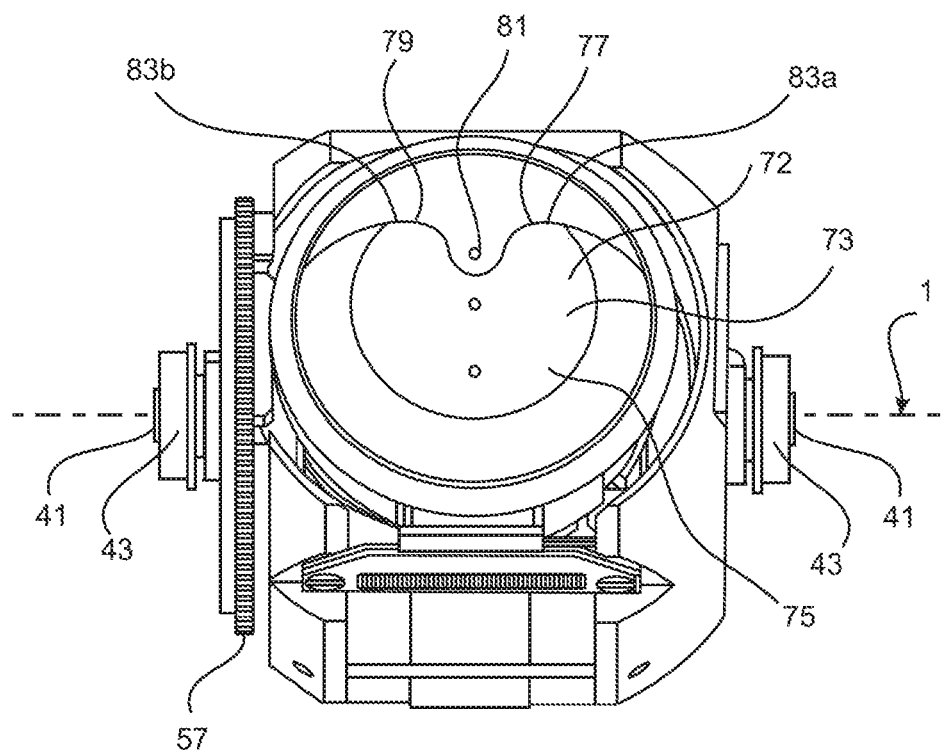
FIG. 8 is a further perspective view, illustrating in particular the indexing platform and the drive portion of the indexing mechanism.

The drive portion 71 further comprises an indexing drive motor 93 drivingly coupled to the drive shaft 89 for selectively rotating the drive shaft about the drive axis 86 in either direction. Upon rotation of the drive shaft 89, the eccentric drive pin 87 is caused to move laterally through a circular path about the drive axis 86, the purpose of which will be explained later. The drive pin 87 has a "parked" position which it occupies when not in operation. The drive pin is shown in the "parked" position in FIGS. 5 and 6.

The indexing plate 75 and the drive pin 87 are adapted to cooperate to facilitate indexing of the sensor device 17 about the indexing axis 4 upon actuation of the indexing drive motor 93. Such cooperation involves rotation of the indexing platform 33 about the pitch axis 1, thereby moving the indexing head 73 towards the drive portion 71 into an operative position, as shown in FIGS. 4 to 7 and FIGS. 11 to 13. At this stage, the axis of rotation of the indexing plate 75 (which corresponds to the indexing axis 4) is parallel to the axis of rotation 91 of the drive shaft 89. With this arrangement, subsequent rotation of the drive shaft 89 under the action of the indexing drive motor 93 causes the drive pin 87 to leave its "parked" position and move laterally through a circular path about the drive axis 86 in the direction corresponding to the direction of rotation of the drive shaft 89. The moving drive pin 87 engages against the cam profile 77 of the indexing plate 75. Interaction between the moving drive pin 87 and the cam profile 77 causes the indexing plate 75 to rotate about its axis of rotation (which corresponds to the indexing axis 4). This causes the sensor device 17 to commence to index about the indexing axis 4. More particularly, the indexing action is initiated by interaction between the laterally moving drive pin 87 and the indexing plate 75, and is completed under the influence of an over-centre biasing mechanism 94 as will be described later.

The drive pin 87 continues to move through the circular path and ultimately returns to the "parked" position, awaiting the next indexing action.

With this arrangement, one complete rotation of the drive shaft 89 causes indexing through 180 degrees from one indexing position to the other.

Once the sensor device 17 has been indexed, the pitch drive mechanism 51 can be actuated to rotate the indexing platform 33 about the pitch axis 1 and restore the sensor device to its original position to continue sensing in the correct plane.

The direction of indexing is, of course, controlled by the direction of rotation of the drive shaft 89 under the influence of the indexing drive motor 93.

Figure 9:
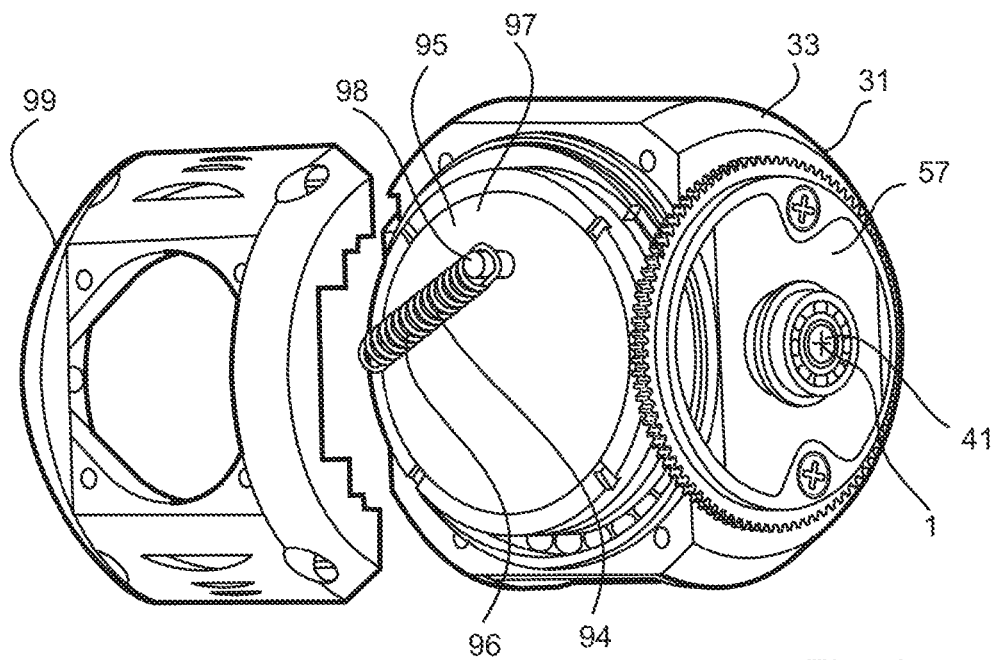
FIG. 9 is a further perspective view of the indexing platform, illustrating in particular a biasing means for biasing the sensor device into the respective indexing positions.
Figure 10:
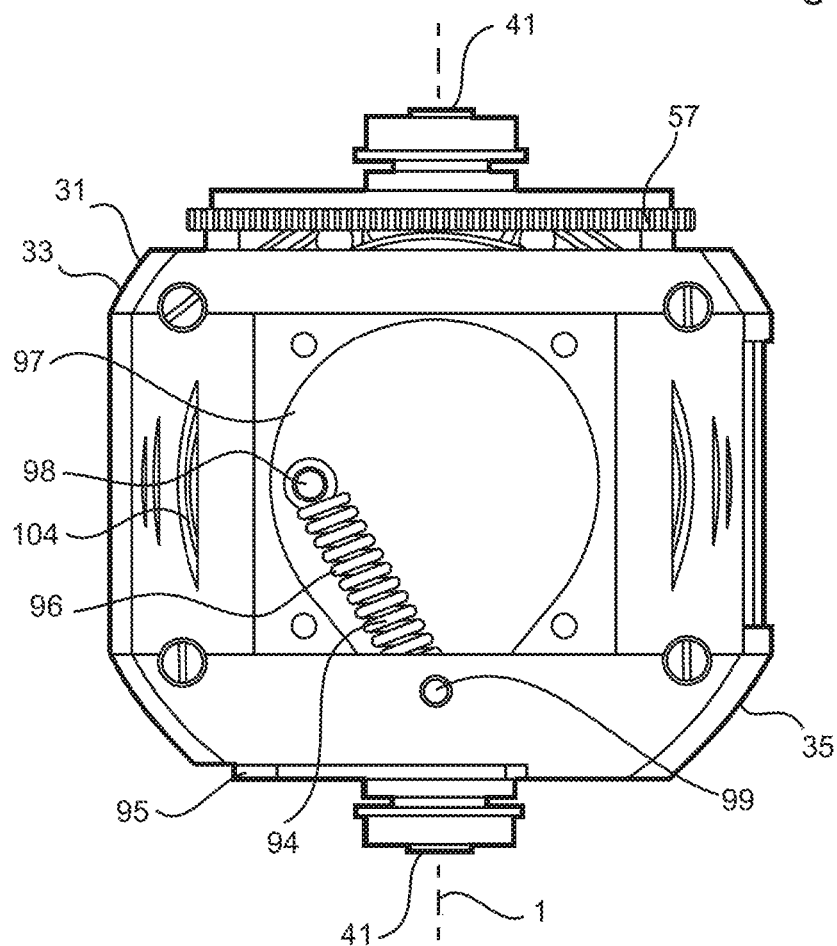
FIG. 10 is a further view of the indexing platform illustrating the biasing means.
Figure 11:
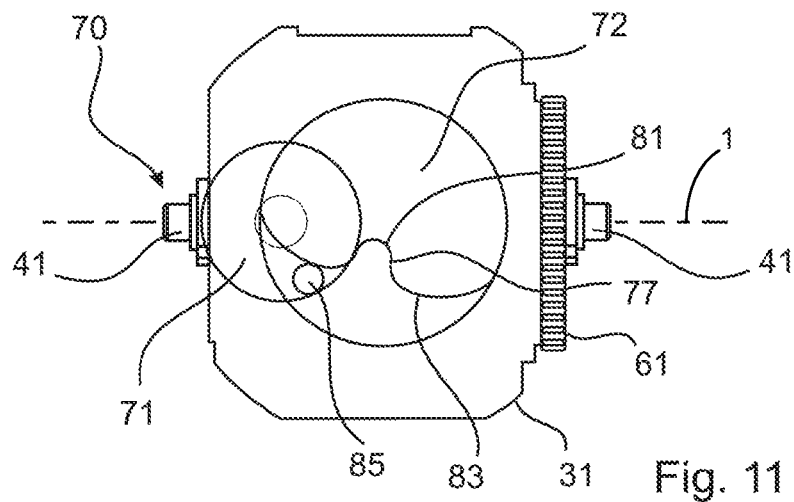
FIGS. 11, 12 and 13 are a series of views illustrating the indexing operation.
Figure 12:
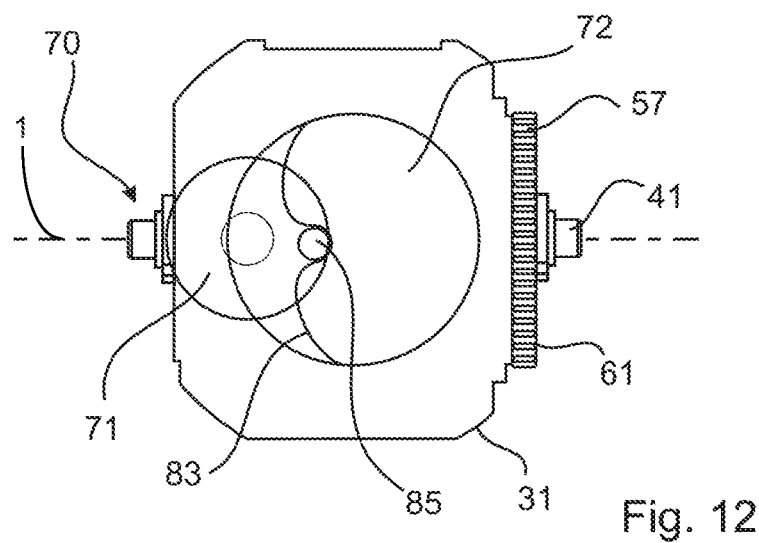
Figure 13:
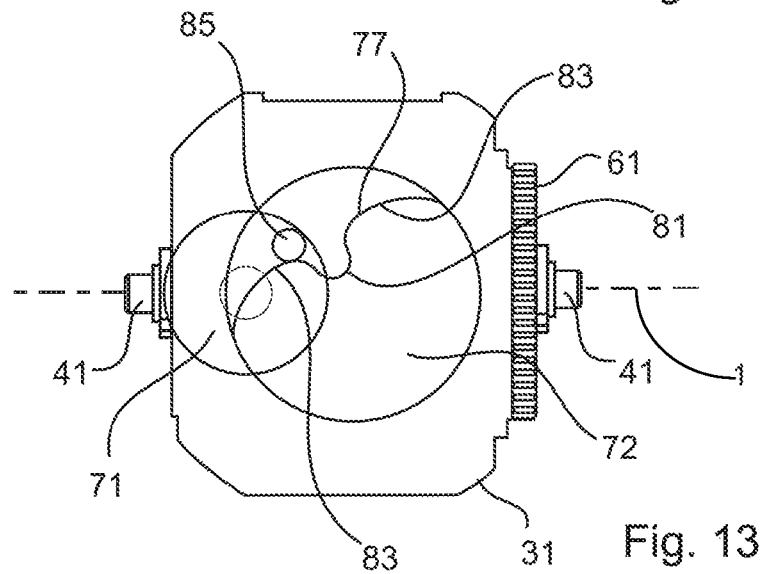
Figure 14:
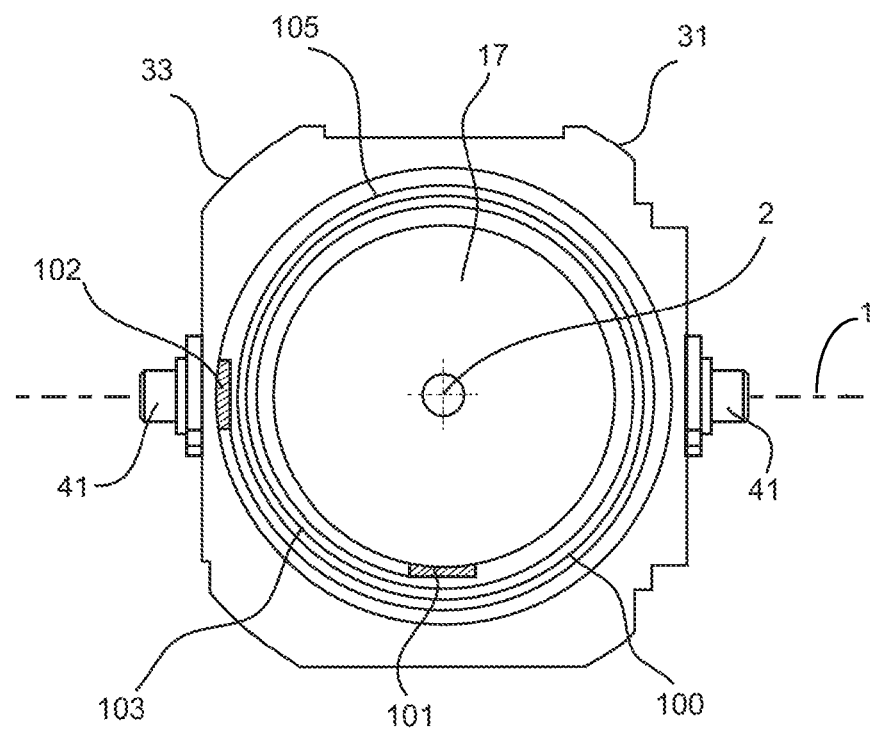
FIG. 14 is a schematic plan view of the indexing platform, a sensor device rotatably supported by the platform and a flexible connecting cable extending between the sensor device and the platform to provide electrical connectivity therebetween, with the sensor device shown in a first indexed position.
Figure 15:
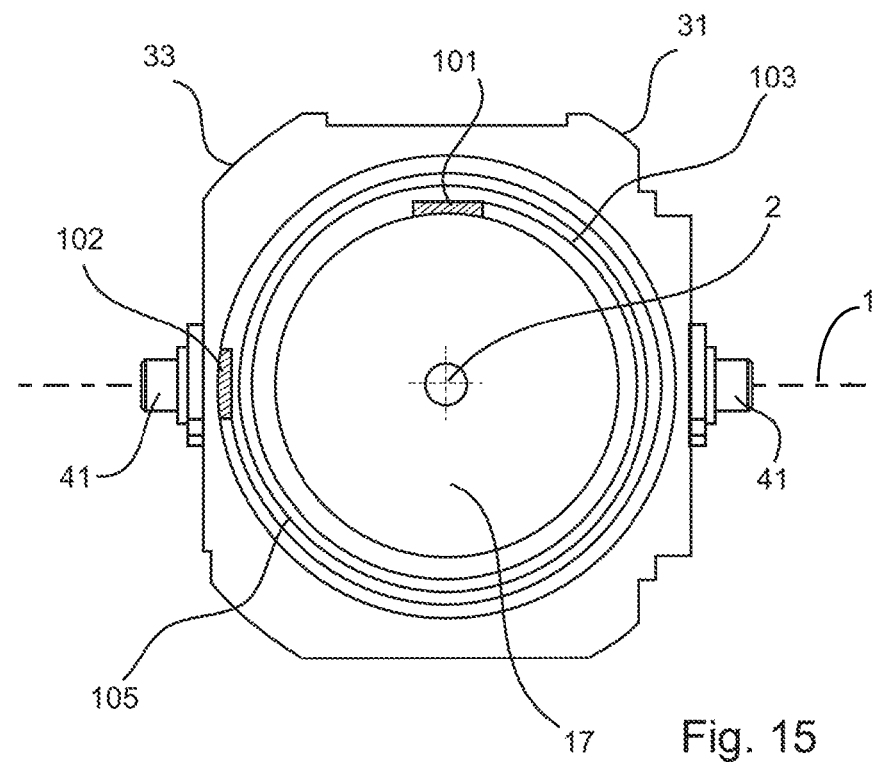
FIG. 15 is a view similar to FIG. 14 except that the sensor device is shown in a second indexed position.

The over-centre biasing mechanism 94, which is shown in FIGS. 9 and 10, is operable to bias the sensor device 17 into the respective indexing positions. The over-centre biasing mechanism 94 comprises a bistable spring mechanism 95 which can pass through an over-centre position to bias the sensor device 17 into the respective indexing position. The bistable spring mechanism 95 is operably coupled to the sensor device 17 and is located on the indexing platform 33 in opposed relation to the indexing head 73.

The bistable spring mechanism 95 comprises a spring 96 and an end plate 97 rotatable in unison with the sensor device 17. One end of the spring 96 is connected to an eccentric pin 98 on the end plate 97 and the other end of the spring 96 is connected to fixed pin 99 mounted on a part of the hollow body 35 in which the sensor device 17 is rotatably supported.

A limit mechanism 104 is provided for limiting the extent of rotation of the sensor device 17 to the two indexing positions, 180 degrees apart.

As the sensor device 17 moves from one indexing position to the other, the spring 96 initially expands during movement away from the one indexing position until reaching the over-centre position and then contracts during movement towards the other indexing position after passing through the over-centre position. In this way, the bistable spring mechanism 95 functions to bias the sensor device 17 into the respective indexing position.

It is necessary to align the indexing platform 33 with respect to the drive pin 87 prior to actuation of the indexing mechanism 71. Specifically, it is necessary to align the pitch of the indexing platform 33 prior to indexing so that the indexing plate 75 is presented correctly to the drive pin 87. An optical alignment system 130 is provided for this purpose, as will be described in detail later.

As mentioned above, the sensor device 17 is rotatable within the indexing platform 33 between the indexing positions. There is a need to establish an electrical connection between the sensor device 17 and the indexing platform 33 accommodating relative movement therebetween as the sensor device 17 indexes. For this purpose, a flexible connecting cable 100 extends between the sensor device 17 and the indexing platform 33, with one end section 101 of the cable 100 connected to the sensor device 17, the other end section 102 connected to the indexing platform 33 and the intermediate section 103 coiled about the indexing axis 4. With this arrangement, the cable 100 is accommodated in the space 105 between the sensor device 17 and the indexing platform 33, as best seen in FIGS. 14 to 17. The intermediate section 103 is coiled several times to accommodate the relative rotational movement without adversely stressing the cable 100 and affecting its service life. In this embodiment, the cable 100 comprises a flat multi-core cable to provide a compact arrangement.

As the sensor device 17 rotates from one indexing position to another, the coiled intermediate section 103 simply winds and unwinds according to the direction of movement, with electrical connectivity being maintained at all times.

Such an arrangement provides a simple yet highly effective electrical connection between the sensor device 17 and the rotary mount 3, which is compact and which obviates the need for a conventional slip ring assembly for electrical connectivity.

Figure 18:
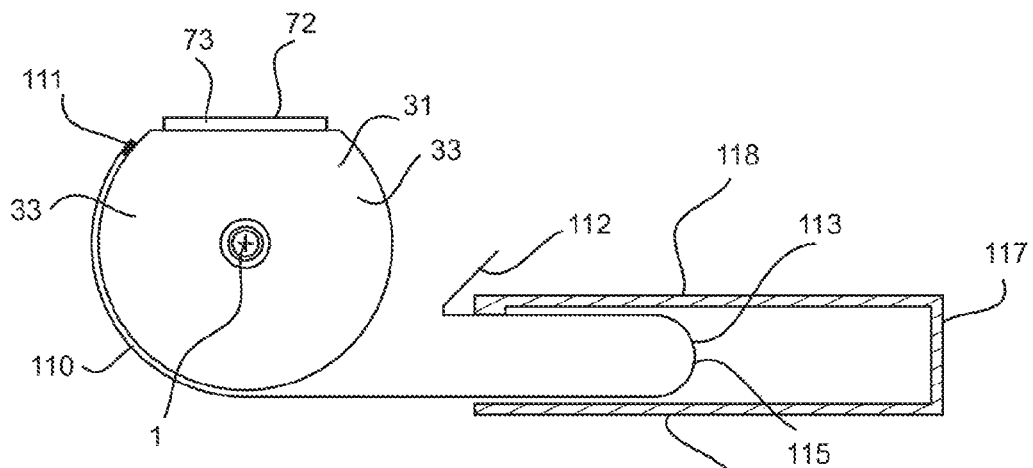
FIG. 18 is a schematic side view of the indexing platform, and a flexible connecting cable extending from the platform to provide electrical connectivity with electrical circuitry elsewhere within the tool, with the indexing platform shown in one rotational position.
Figure 19:
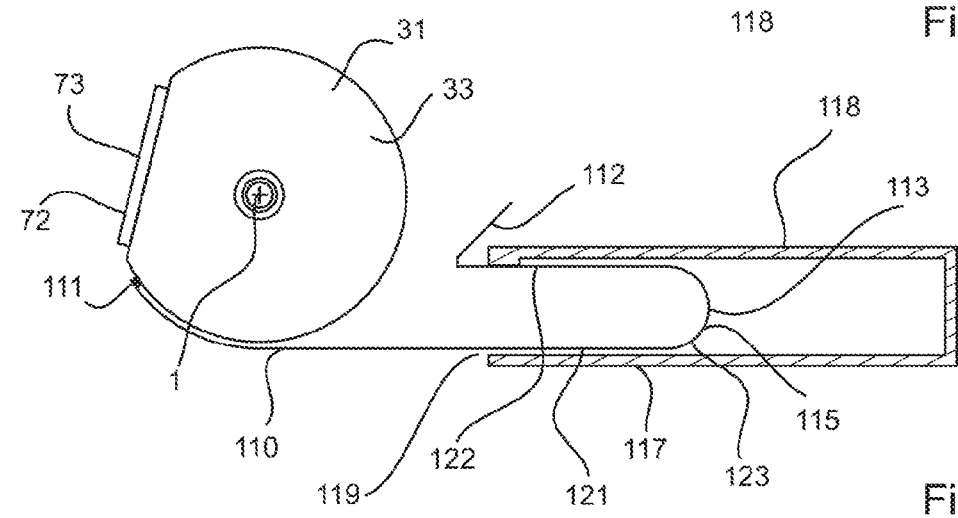
FIG. 19 is a view similar to FIG. 18, except mat me indexing platform is shown in another rotational position.
Figure 20:
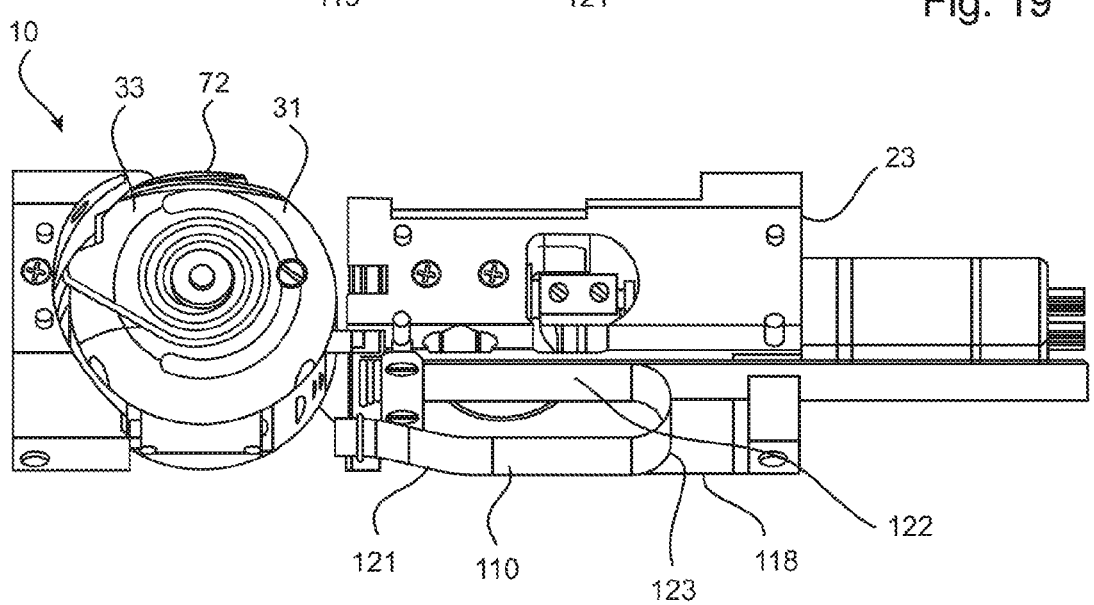
FIG. 20 is a perspective view of the down hole surveying tool, illustrating in particular the indexing platform, and the flexible connecting cable extending from the platform to provide electrical connectivity with electrical circuitry elsewhere within the tool.

There is also a need for electrical connectivity between the indexing platform 33 and the base 23 which accommodates electronic circuitry for the surveying tool 10. For this purpose, a flexible connecting cable 110 extends between the indexing platform 33 and the electronic circuitry (not shown), with one end section 111 of the cable 110 connected to the indexing platform 33, the other end section 112 connected to the electronic circuitry, and the intermediate section 113 configured as a loop 115, as shown in FIGS. 18, 19 and 20. In this embodiment, the cable 110 comprises a flat multi-core cable. The loop 115 is accommodated in a cable receptacle 117 having two opposed sides 118 and an open end 119 through which the cable extends. The loop 115 comprises two straight sections 121, 122 and a turn section 123 extending between the two straight sections. The two straight sections 121, 122 are constrained and guided by the sides 118 of the cable receptacle 117, with straight section 121 being adapted to undergo translation motion, sliding along the adjacent side 118 of the cable receptacle 117 as the indexing platform 33 rotates. This accommodates relative movement between the indexing platform 33 and the electronic circuitry. As the straight section 121 of the cable 110 slides, the turn section 123 rolls within the cable receptacle 117 in unison with the translating straight section 121. The portions of the cable 110 constituting the straight sections 121, 122 and the turn section of course varies as the straight section translates and the turn section 123 rolls.

Such an arrangement provides a simple yet highly effective electrical connection between connectivity between the indexing platform 33 and the base 23, which is compact and which obviates the need for a conventional slip ring assembly for electrical connectivity. The loop 115 preferably has a relatively large radius of curvature to avoid adversely stressing the cable 110 and affecting its service life.

As previously described, it is necessary to align the indexing platform 33 prior to actuation of the indexing mechanism 70. Specifically, it is necessary to align the pitch of the indexing platform 33 prior to indexing so that the indexing plate 75 is presented correctly to the drive pin 87. The optical alignment system 130 is operable to sense correct alignment between the drive and driven portions 71, 72 for operative engagement therebetween, whereby the driven portion 72 can receive drive from the drive portion 71 to cause indexing of the sensor device about the indexing axis 4.

Figure 21:
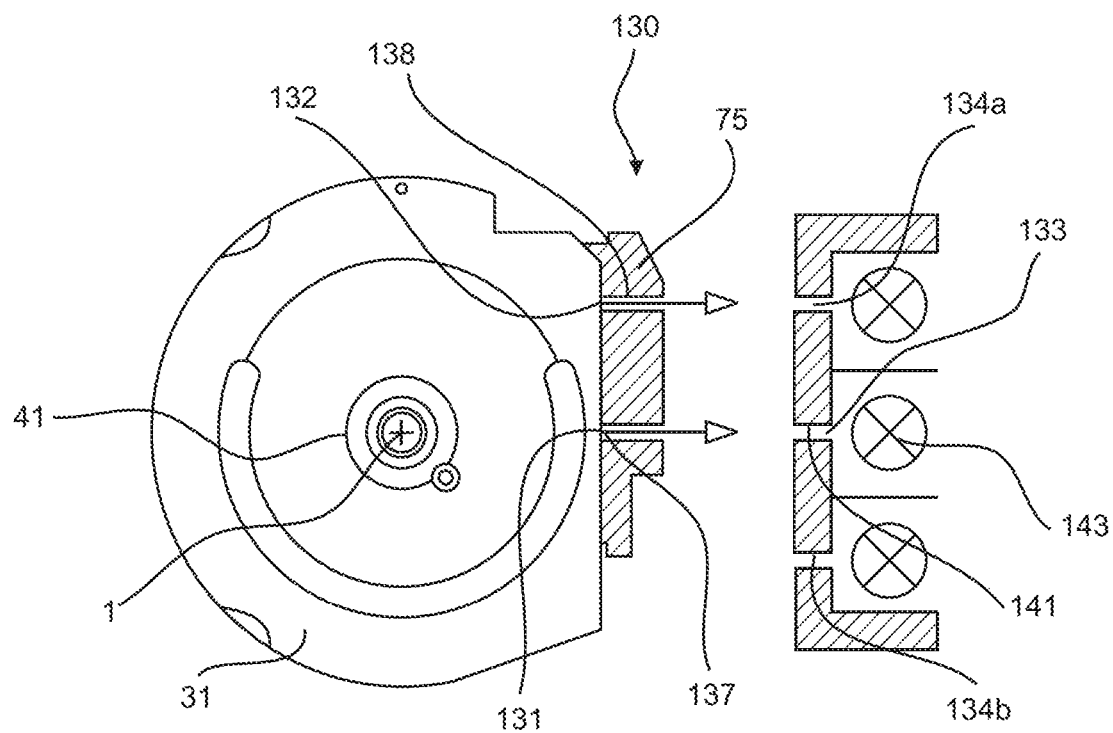
FIG. 21 is a schematic view of an optical alignment system for sensing alignment between drive portion and the driven portion of the indexing mechanism, the driven portion, which is mounted on the indexing platform, being shown in a first indexed position.
Figure 22:
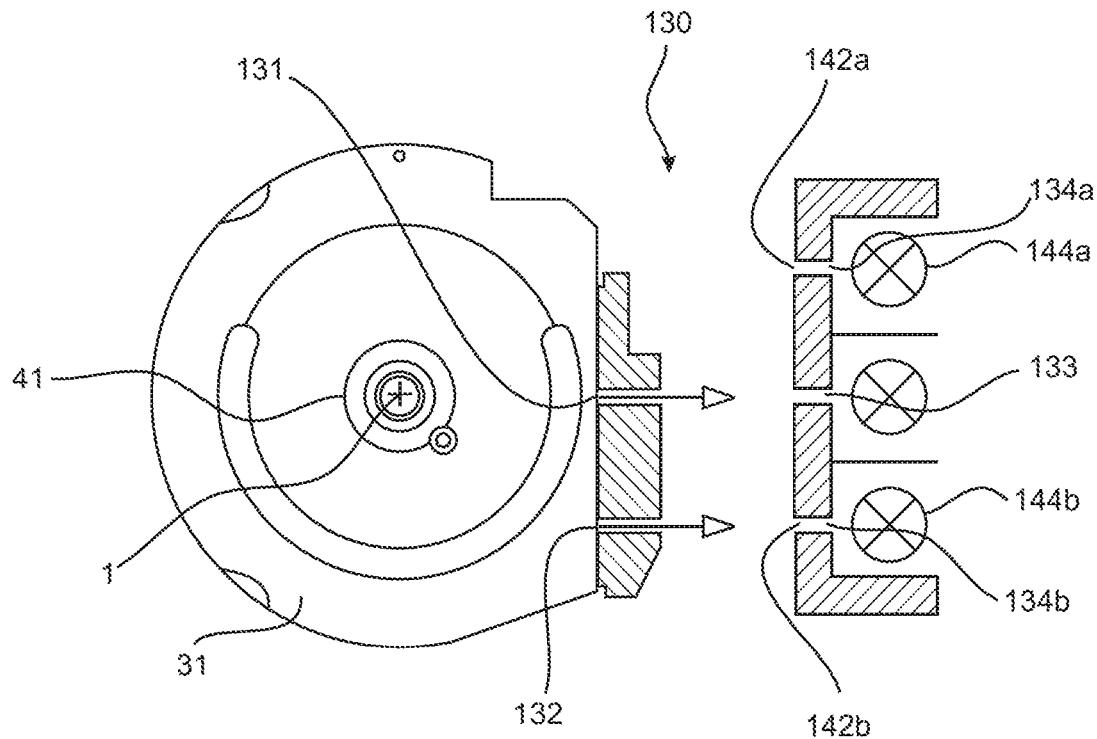
FIG. 22 is a view similar to FIG. 21, except that the driven portion is shown in a second indexed position.
Figure 23:
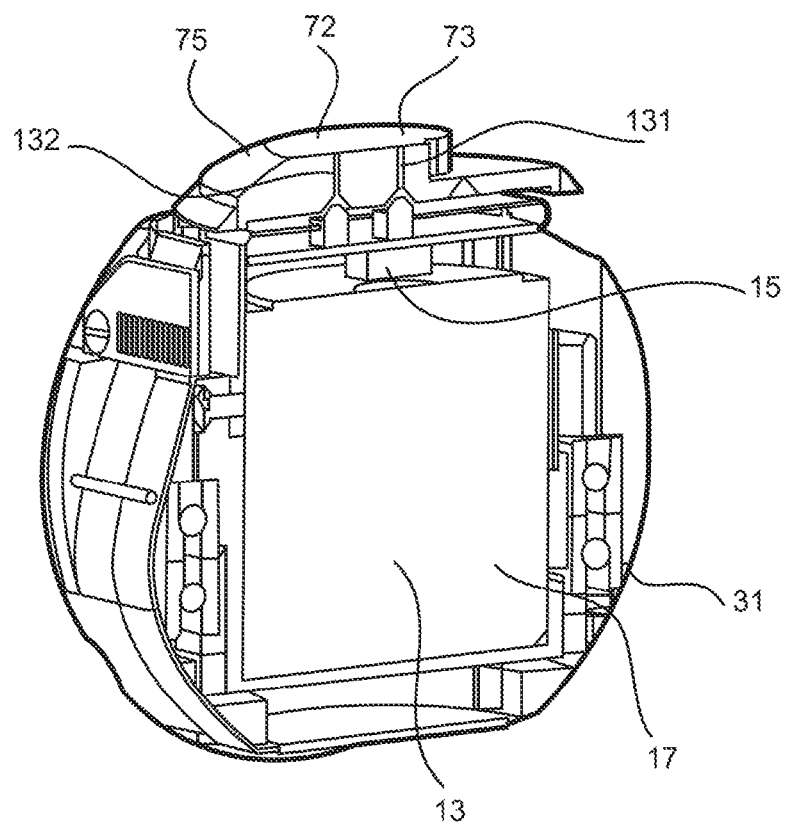
FIG. 23 is a sectional view of the indexing platform, illustrating in particular the driven portion and that part of the optical alignment system provided thereon.
Figure 24:
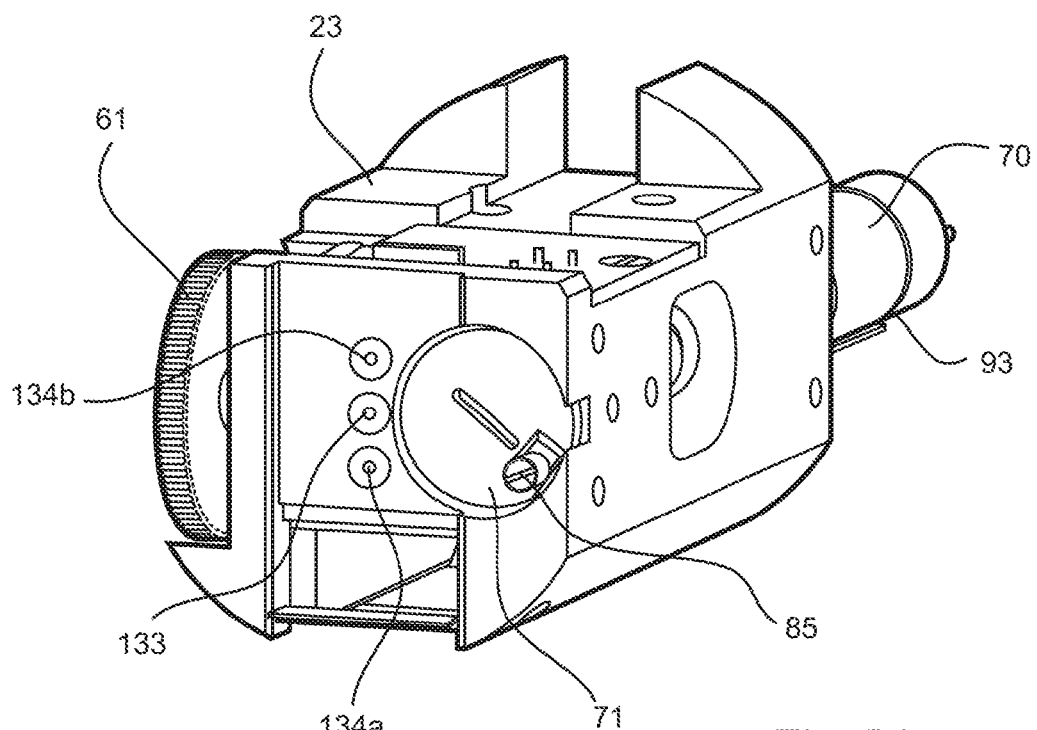
FIG. 24 is a perspective view of part of the base of the down hole surveying tool, illustrating in particular the drive portion and that part of the optical alignment system provided thereon.

Referring now to FIGS. 21 and 22, the optical alignment system 130 comprises a first optical signal transmitter 131 and a first optical signal receiver 133 which cooperate to confirm that alignment is correct. The first optical signal transmitter 131 is adapted to generate and project a modulated beam of light from the indexing platform 33 in a direction perpendicular to the surface of the indexing plate 75 and parallel to the indexing axis 4. Specifically, the first optical signal transmitter 131 comprises a central aperture 137 in the indexing plate 75 and an optical emitting device (not shown) located behind the aperture 137 for emitting the modulated beam of light. The first optical signal receiver 133 comprises a corresponding aperture 141 and optical detector 143 mounted externally of the indexing platform 33, typically on the base 23, in such a way that the apertures 137, 141 align and the modulated beam is detected when the indexing plate 75 is in the correct position.

In this embodiment, the optical alignment system 130 is configured to also detect that the sensor device 17 has indexed correctly into the desired indexing position. As previously mentioned, there are two indexing positions for the sensor device 17, with the two indexing positions being 180 degrees apart.

In the arrangement illustrated, the optical alignment system 130 further comprises a second optical signal transmitter 132 offset from the first optical signal transmitter 131. The second optical signal transmitter 132 comprises a second aperture 138 in the indexing plate 75 and an optical emitting device (not shown) located behind the aperture 138 for emitting the modulated beam of light.

The optical alignment system 130 further comprises one or more further optical signal receivers 134 offset from the first optical signal receiver 133. In the arrangement shown, there are two further optical signal receivers 134a, 134b on opposed sides of the first optical signal receiver 133. The further optical signal receivers 134a comprises a corresponding aperture 142a and optical detector 144a. The further optical signal receivers 134b comprises a corresponding aperture 142b and optical detector 144b.

With this arrangement, the first optical signal transmitter 131 and a first optical signal receiver 133 cooperate to provide confirmation of alignment of the pitch of the indexing platform 33 prior to indexing so that the indexing plate 75 is presented correctly to the drive pin 87. Further, the second optical signal transmitter 132 cooperates with the further optical signal receivers 134 to provide confirmation that the sensor device 17 has indexed correctly into the desired indexing position. As the two indexing positions are 180 degrees apart, further optical signal receiver 134a functions to monitor one indexing position and further optical signal receiver 134b functions to monitor the other indexing position. FIG. 21 illustrates the arrangement where the sensor device 17 is in the first indexing position, with second optical signal transmitter 132 cooperating with the further optical signal receivers 134a to provide confirmation that the sensor device 17 has indexed correctly into the first indexing position. Similarly, FIG. 22 illustrates the arrangement where the sensor device 17 is in the second indexing position, with second optical signal transmitter 132 cooperating with the further optical signal receivers 134b to provide confirmation that the sensor device 17 has indexed correctly into the second indexing position.

Because the gyroscope 13 and the accelerometer 15 are rigidly connected together, they undergo indexing in unison. In this way, the sensitive axes of the gyroscope 13 and the accelerometer 15 can be aligned to cancel systematic errors.

Operation of the borehole surveying tool 10 will now be described.

In performing a borehole surveying operation, the tool. 10 is moved along the borehole, typically suspended from a wire line. At each location where a survey measurement is required, the tool 10 is stopped and then activated, and the survey process initiated. The survey process involves changing the roll angle of the housing 29, and then rotating the indexing platform 33 about the pitch axis 1 using the pitch drive mechanism 51, to move the respective planes of the sensitive axes of the gyroscope 13 and accelerometer 15 as required. Typically, the sensitive axes are moved into positions where they are aligned with respective horizontal planes. As the indexing platform 33 rotates, the cable 110 moves to accommodate relative movement between the indexing platform 33 and the electronic circuitry mounted on the base 23, thereby maintaining electrical connection between connectivity between the indexing platform 33 and the electronic circuitry, as previously described.

In this embodiment, the sensitive axes of the gyroscope 13 and the accelerometer 15 are required to be exactly level within respective horizontal planes. When the sensitive axes are level, a first measurement, or a set of first measurements, can then be taken. In order to reduce or cancel systematic errors, it is routine to index the gyroscope 13 and accelerometer 15 through 180 degrees to obtain a second measurement, or a set of second measurements. The first and second measurements are then processed in known manner to obtain a resultant measurement from which systematic errors have been reduced or cancelled. In order to index the sensor device 17 to take the second measurement, or set of second measurements, it is first necessary to rotate the indexing platform 33 about the pitch axis 1 using the pitch drive mechanism 51 to move the indexing head 73 towards the drive portion 71 into the position shown in FIGS. 4 to 7 and FIGS. 11 to 13. At this stage, the axis of rotation of the indexing plate 75 (which corresponds to the indexing axis 4) is parallel to the axis of rotation 91 of the drive shaft 89.

The optical alignment system 130 is used to ensure alignment of the pitch of the indexing platform 33 with respect to the drive pin 87, prior to operation of the indexing drive motor 93, as previously described.

Subsequent rotation of the drive shaft 89 under the action of the indexing drive motor 93 causes the drive pin 87 to move laterally through a circular path about the axis 91 in the direction corresponding to the direction of rotation of the drive shaft 89. The moving drive pin 87 interacts with the indexing plate 75 to cause it to rotate about its axis of rotation (which corresponds to the indexing axis 4). This causes the sensor device 17 to index about the indexing axis 4 through 180 degrees and assume the second indexing position. The electrical connection between the sensor device 17 and the indexing platform 33 is maintained by the flexible connecting cable 100 coiled, about the indexing axis 4, as previously described.

Once the sensor device 17 has been indexed, the pitch drive mechanism 51 can be actuated to rotate the indexing platform 33 about the pitch axis 1 and restore the sensor device to its earlier position at which the second measurement, or set of second measurements, can then be taken.

Once the first and second measurements, or set of measurements, have been taken, the tool 10 can be deactivated and then moved to the next position within the borehole at which a further survey measurement is to be taken. When at the next position, the tool 10 is activated and the survey process initiated, as described before.

The procedure is continued until the survey has been completed.

In the embodiment described, the sensor device 17 comprises the gyroscope 13 and the accelerometer 15. The indexing process, when applied to the accelerometer, has the beneficial effect of cancelling its systematic errors, thereby allowing a low performance device to level the gyroscope sensing plane to a degree otherwise only achievable using a more capable and expensive accelerometer. Furthermore, the indexing process has the additional benefit of eliminating any errors in the alignment of the sensing axes between the gyroscope and the accelerometer.

In another embodiment, which is not shown, the accelerometer may be omitted, in which case the sensor device 17 may comprise only the gyroscope 13.

It should be appreciated that the scope of the invention is not limited to the scope of the embodiment described.

Modifications and improvements may be made without departing from the scope of the invention.

Further, it should be appreciated that the invention may find application in apparatus, devices and mechanisms other than down hole surveying tools.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claim defining the invention is as follows:

1. An apparatus for indexing a device about an indexing axis, the apparatus comprising a base, a support for supporting the device for rotation about the indexing axis, the support comprising a rotary mount supported on the base for rotation about a pitch axis transverse to the indexing axis, an indexing drive mechanism for indexing the device about the indexing axis, the indexing drive mechanism comprising a drive portion and a driven portion, the drive portion being provided on the base and the driven portion being provided on the rotary mount and drivingly connected to device, the drive portion comprising a drive element mounted eccentrically for rotation about a drive axis, the driven portion being movable into and out of engagement with the drive portion upon rotation of the rotary mount about the pitch axis, whereby the driven portion when in engagement with the drive portion is adapted to receive drive therefrom to cause indexing of the device about the indexing axis.

2. The apparatus according to claim 1 wherein the drive element comprises a drive pin configured as a roller pin.

3. The apparatus according to claim 1 wherein the drive element is provided at one end of a drive shaft which has an axis of rotation and which is configured as a crank, with the drive element offset from the axis of rotation of the drive shaft.

4. The apparatus according to claim 3 wherein the drive portion further comprises an indexing drive motor drivingly coupled to the drive shaft for selectively rotating the drive shaft about its axis in either direction.

5. The apparatus according to claim 4 wherein the driven portion comprises an indexing head rotatably mounted on the support and connected to the device, the indexing head being engagable with the drive element to receive rotational drive therefrom.

6. The apparatus according to claim 5 wherein the indexing head comprises an indexing plate configured to define a cam profile presenting a cam face, whereby upon rotation of the drive shaft, the eccentric drive element is caused to move laterally through a circular path about the axis of rotation of the drive shaft, imparting rotation to the indexing plate and thereby causing the device to undergo indexing motion.

7. The apparatus according to claim 1 further comprising a pitch drive mechanism for selectively rotating the rotary mount about the pitch axis.

8. The apparatus according to claim 7 wherein the pitch drive mechanism comprises a pitch drive motor drivingly coupled to the rotary mount.

9. The apparatus according to claim 8 wherein the pitch drive motor is drivingly coupled to the rotary mount through a drive transmission, the drive transmission comprising a ring gear mounted on the rotary mount coincidently with the pitch axis, a drive shaft, and a drive pinion rigidly mounted on the drive shaft and in meshing engagement with the ring gear.

10. The apparatus according claim 1 wherein device supported for rotation about the indexing axis comprises a sensor device.

11. The apparatus according to claim 10 wherein the sensor device comprises a gyroscope.

12. The apparatus according to claim 11 wherein the gyroscope comprises a two-axis gyroscope having two sensitive axes, wherein the two-axis gyroscope is mounted on the support such that the two sensitive axes are perpendicular to the indexing axis.

13. The apparatus according to claim 10 wherein the sensor device comprises an accelerometer.

14. The apparatus according to claim 13 wherein the accelerometer comprises a two-axis accelerometer having two sensitive axes, wherein the two-axis accelerometer is mounted on the support such that the two sensitive axes are perpendicular to the indexing axis.

15. The apparatus according to claim 10 wherein the sensor device comprises a composite device comprising a two-axis gyroscope having two sensitive axes and a two-axis accelerometer having two sensitive axes, with the two sensitive axes being perpendicular to the indexing axis.

16. The apparatus according to claim 15 wherein the two-axis gyroscope and a two-axis accelerometer are adapted for rotation in unison about the indexing axis.

17. The apparatus according to claim 1 further comprising an alignment sensor for sensing alignment between the drive portion and the driven portion for operative engagement therebetween.

18. The apparatus according to claim 17 wherein the alignment sensor is configured to detect that the device has indexed correctly about the indexing axis into the desired indexing position.

19. The apparatus according to claim 17 wherein the alignment sensor comprises an optical alignment system.

20. The apparatus according to claim 19 wherein the optical alignment system comprise a first optical signal transmitter and a counterpart first optical signal receiver adapted to cooperate to confirm that alignment is correct.

21. The apparatus according to claim 20 wherein the alignment system is configured to detect that the device has indexed correctly about the indexing axis into the desired indexing position, and wherein the optical alignment system further comprises a second optical signal transmitter offset from the first optical signal transmitter.

22. The apparatus according to claim 20 further comprising one or more further optical signal receivers offset from the first optical signal receiver.

23. The apparatus according to claim 20 wherein the rotary mount comprises an indexing platform and the driven portion comprises an indexing plate, and wherein the first optical signal transmitter is adapted to generate and project a modulated beam of light from the indexing platform in a direction perpendicular to the surface of the indexing plate and radial to the indexing axis.

24. The apparatus according to claim 23 wherein the optical alignment system further comprises a second optical signal transmitter offset from the first optical signal transmitter and two further optical signal receivers on opposed sides of the first optical signal receiver, wherein the first optical signal transmitter and counterpart first optical signal receiver are adapted cooperate to provide confirmation of alignment of the pitch of the rotary mount prior to indexing so that the indexing plate is presented correctly to the drive element, and wherein the second optical signal transmitter cooperates with the further optical signal receivers to provide confirmation that the sensor device has indexed correctly into the desired indexing position.

25. The apparatus according to claim 23 wherein the first optical signal transmitter comprises a central aperture in the indexing plate and an optical emitting device located behind the aperture for emitting the modulated beam of light.

26. The apparatus according to claim 25 wherein the first optical signal receiver comprises a corresponding aperture and optical detector mounted externally of the rotary mount, typically on the base, wherein the two apertures align and the modulated beam is detected when the indexing plate is in the correct position.

27. The apparatus according to claim 26 wherein the optical alignment system further comprises a second optical signal transmitter offset from the first optical signal transmitter, and wherein the second optical signal transmitter comprises a second aperture in the indexing plate and an optical emitting device located behind the aperture for emitting a respective modulated beam of light.

28. The apparatus according to claim 1 further comprising a flexible connecting cable extending between the rotary mount and the base, with one end section of the cable connected to the rotary mount, the other end section of the cable connected to the base, and an intermediate section of the cable configured as a loop.

29. The apparatus according to claim 28 wherein the loop is accommodated in a cable receptacle having two opposed sides and an open end through which the cable extends.

30. The apparatus according to claim 29 wherein the loop comprise two straight sections and a turn section extending between the two straight sections and wherein the two straight sections are adapted to be constrained and guided by sides of the cable receptacle, with one straight section being adapted to undergo translation motion, sliding along the adjacent side of the cable receptacle upon rotation of the rotary mount.

31. The apparatus according to claim 1 further comprising a flexible connecting cable extending between the device and the support, with one end section of the cable connected to the device, the other end section of the cable connected to the support and the intermediate section of the cable coiled about the indexing axis.

32. A down hole surveying tool incorporating an apparatus according to claim 1, wherein the device comprises a sensor device.

33. A down hole surveying tool comprising a sensor device rotatable about an indexing axis, a base, a support for supporting the sensor device for rotation about the indexing axis, the support comprising a rotary mount supported on the base for rotation about a pitch axis transverse to the indexing axis, a pitch drive mechanism for selectively rotating the rotary mount about the pitch axis, and an indexing drive mechanism for indexing the sensor device about the indexing axis, the indexing drive mechanism comprising a drive portion and a driven portion, the drive portion being provided on the base and the driven portion being provided on the rotary mount and drivingly connected to the sensor device, the drive portion comprising a drive element mounted eccentrically for rotation about a drive axis, the driven portion being movable into and out of engagement with the drive portion upon rotation of the rotary mount about the pitch axis, whereby the driven portion when in engagement with the drive portion can is adapted to receive drive therefrom to cause indexing of the sensor device about the indexing axis.

34. A method of performing a down hole surveying operation using a down hole surveying tool according to claim 32.

* * * * *